Feb. 6, 1934.     H. R. LEWIS     1,946,025
FILLING MACHINE
Filed Sept. 30, 1931

Inventor
Harold R. Lewis
By
[signature]
Attorney

Patented Feb. 6, 1934

1,946,025

UNITED STATES PATENT OFFICE 1,946,025

FILLING MACHINE

Harold R. Lewis, Hoopeston, Ill., assignor to Food Machinery Corporation, San Jose, Calif., a corporation of Delaware Application September 30, 1931
Serial No. 566,113

1 Claim. (Cl. 226—103)

This invention relates to a machine for filling cans with liquids or mobile materials and is particularly adapted to the filling of the commercial cans with the various liquid and semi-liquid substances that are packed in cans.

The improvement consists in means for controlling the delivery of liquid and the manner of directing its flow so that the measured quantity going to each individual can will be more accurately measured.

This improvement is carried out by means of devices affected by the presence of a can and in the angular direction of the flow passages to always direct the material being handled in a predetermined direction.

In the type of filling machine to which this improvement is applied there is a filling nozzle that aligns with the can during the filling operation, and a plunger having vertical movement in the nozzle for controlling the flow of material through the nozzle. Also adjacent to the nozzle there is a measuring chamber into which material is admitted from a suitable source of supply, and from which the measured material is discharged through the nozzle into a positioned can.

Heretofore the passage from the measuring chamber to the filling nozzle has been an aperture with horizontally disposed walls, and it has been found in practice that the residue of material always remaining in this passage could flow back into the measuring chamber or it could flow into the filling nozzle. When it flowed into the measuring chamber it made no difference in the following measured charge, or in the charge just placed in the positioned can, if, however, it tended to flow into the can it varied the fill to some extent.

The improvement disclosed by this application corrects this condition and provides a means whereby the residual material always in the passage during the operation of the machine has a sharp cut-off and the walls of the passage are inclined toward the measuring chamber so that the flow of this residual material will always be toward the measuring chamber and thereby is obtained a more accurately measured charge in each can.

It is also absolutely essential that the control of the flow of material into the nozzle is by the presence of a can under the nozzle or the charge of material would be ejected onto the machine and totally lost.

It is therefore a principal object of the invention to provide means whereby the flow of material from a measuring chamber is so directed and controlled that residual material remaining in the adjacent passages is always directed back into the measuring chamber.

It is also an object of the invention to provide in a filling machine a means for controlling the flow of material into a positioned can so that no material will be directed to the filling nozzle if a can is not present to receive it.

It is also an object of the invention to provide means for giving a sharp cut-off of flowing material when the complete charge has been delivered to a positioned can.

Referring now to the drawing accompanying this application it will be seen how this improvement is applied to the well known type of filling machine.

Figure 1:
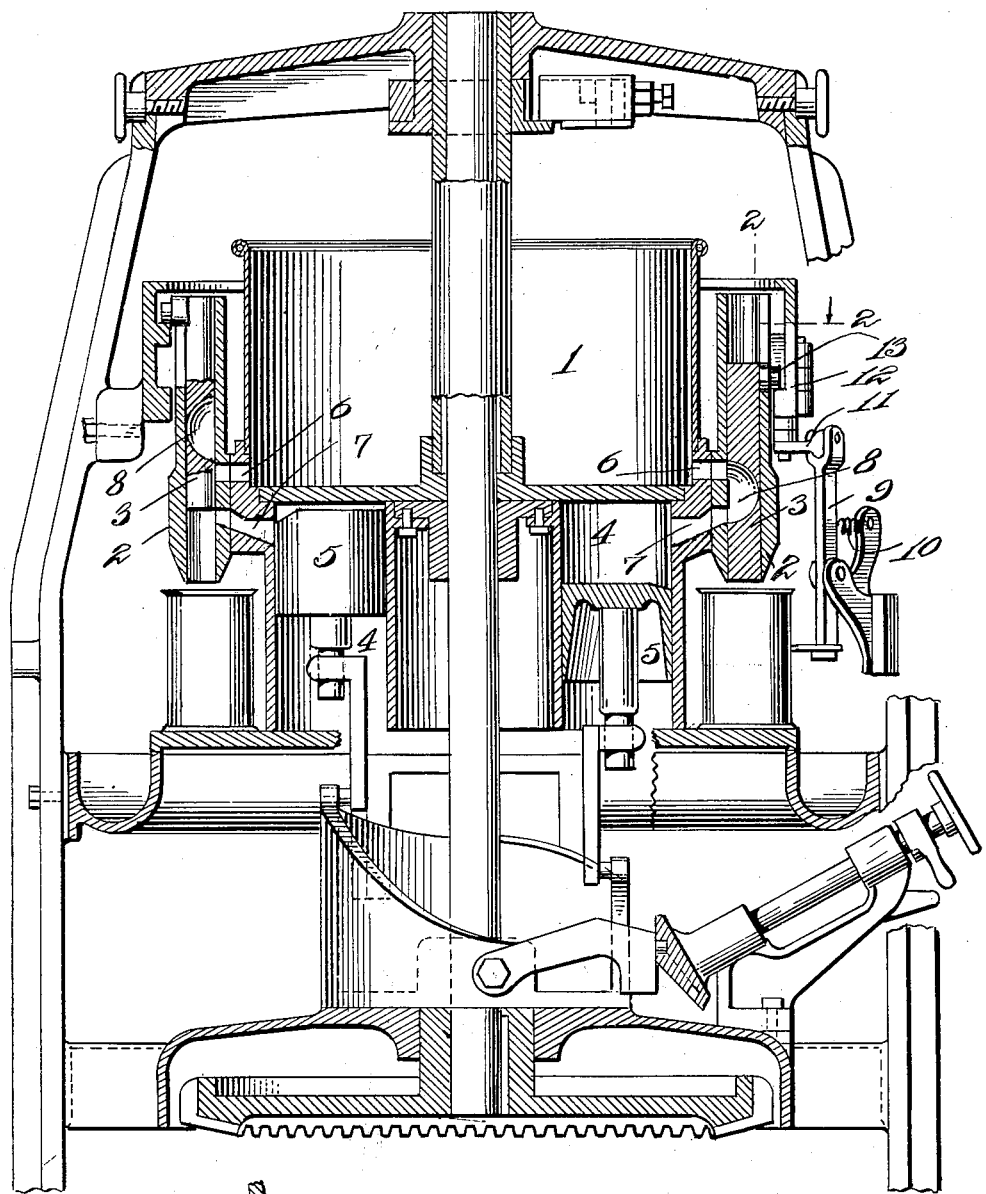
Figure 1 represents a vertical section of a filling machine that is shown very much in diagram and is not intended to show all of the structural details, but does show very clearly the position and angularity of the passage from the measuring chamber to the filling nozzle and shows one view of the device through which the presence of a can controls the flow of material.

A filling machine to which these improvements are applicable comprises a material tank 1, having a series of filling nozzles 2 arranged around its outer periphery, and with a cut off plunger 3 in each nozzle. Underneath the tank 1 are a series of measuring chambers 4 with plungers 5. Passageways 6 and 7 and by-pass passage 8 provide a pathway for the material to flow from the tank 1 to the measuring chambers 4. The position of the plunger 3 at the right of Fig. 1 is the proper position for filling the measuring chamber 4 and is what may be termed the normal position of the plunger 3, while the position of the plunger 3 at the left of Fig. 1 is the discharging position of the plunger 3 which permits the measured charge of material to flow from the measuring chamber 5 through a passage 7 into a positioned can.

Heretofore the passageways 7 have been positioned horizontally, while my improvement positions them at an inclination toward the measuring chamber 4. This inclined passageway presents several important improvements in that it gives a more natural flow to the material and is especially advantageous when handling semi-plastic material, the principal importance of the improvement, however, resides in the fact that when the plunger 3 descends from the position at the left of Fig. 1 to its normal position as at the right of the view the material remaining in the passageway 7 is cut off from the filling nozzle by a sharp clean cut and immediately tends to flow back into the measuring chamber 4, while in the horizontal passageway heretofore used when the cut off took place some of the material would follow the plunger down into the nozzle, being easily pulled out of the horizontal passageway by the plunger and thus adding a little additional material to each can, and from the fact that this residue varied more or less with each movement of a plunger it resulted in an uneven fill in the cans, whereas with the inclined passageway the uniformity of fill is very much improved. It can be seen that when the plunger 3 engages a semi-plastic material with the inclined passage that instead of cutting it there is some tendency for the material to squeeze back into the passage way, but this tendency will be uniform with any material so that the accuracy of fill is substantially uniform.

When a can is missing from a filling nozzle it is necessary to prevent a movement of the plunger 3 from its normal position at the right of the machine so that the charge of material in the measuring chamber will not be wasted. This condition is accomplished through a mechanism operated by a can in position for filling.

There are a great many devices for accomplishing this result and the one shown to illustrate the operation is more or less diagrammatic but will clearly show what the operation is.

Figure 2:
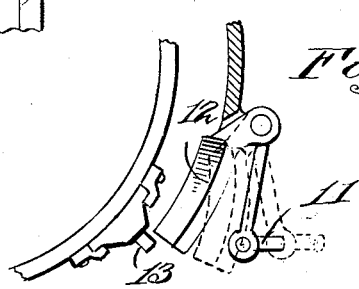
Figure 2 shows a plan somewhat in diagram of another view of the mechanism operated by a can for controlling the flow of material to the filling nozzle.

9 is a lever that is moved slightly each time a can passes. This lever is held normally in the path of a moving can by a spring 10. A link 11 connects with a swinging cam section 12 which is normally held away from its operative position as the dotted lines show in Fig. 2, but whenever a can is present under a filling nozzle the cam section 12 is positioned so the roller 13 will ride thereon and thus raise the plunger 3 to permit discharge of the material in the measuring chamber into the positioned can. If no can is present under a filling nozzle the cam section 12 is held in the dotted position and the roller 13 will pass under it and the plunger 3 will not be moved, so that as the plunger 5 in the measuring chamber 4 rises to discharge the measured charge therein the charge will be forced back into the tank from whence it came.

What I claim as new and desire to secure by Letters Patent is:

An apparatus for measuring and delivering a flowing material to a positioned container comprising a tank for a supply of material, a measuring chamber and a sliding cut-off valve, the tank, chamber and cut-off valve having passages which are adapted to communicate to form a passageway from the tank to the chamber, the end of said passageway adjacent said chamber being always open and having a downwardly inclined wall so that residue material remaining in said aperture after passing a measured charge of material into a container will flow back into said measuring chamber.

HAROLD R. LEWIS.